INVENTORS
WILLIAM C. BAKER
JAMES M. BENSON
CHARLES E. HAWK
BY Cushman Darby & Cushman
ATTORNEYS

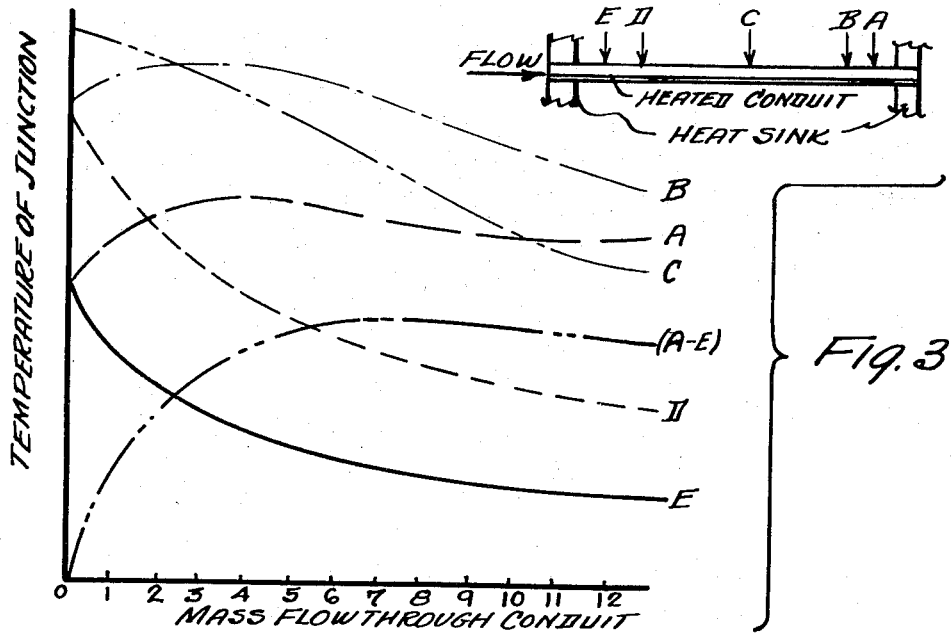
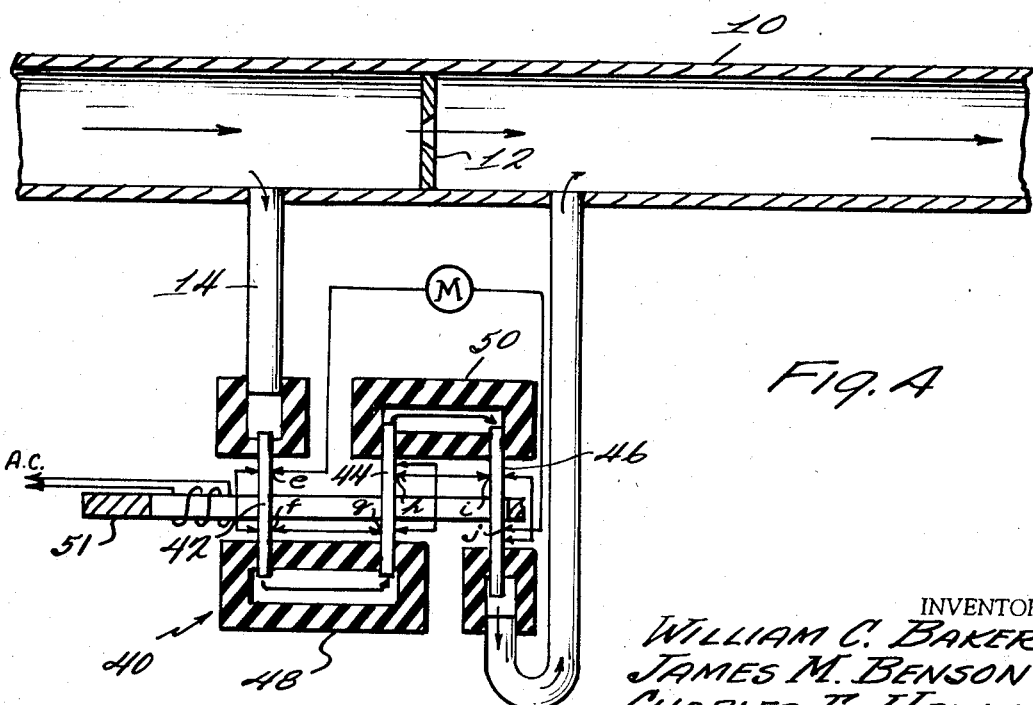

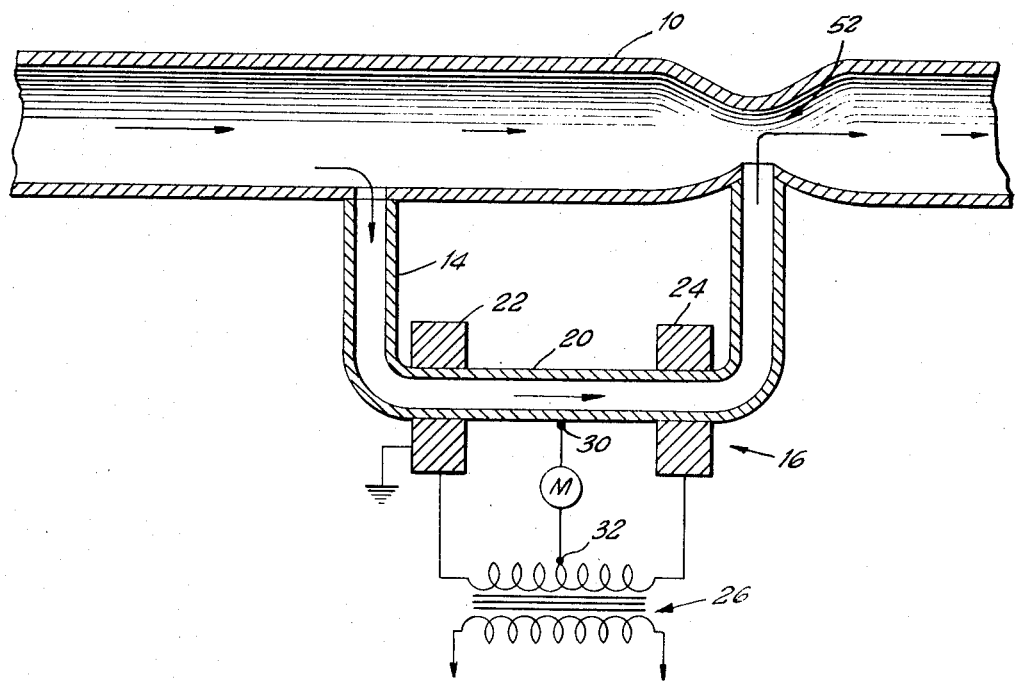

3,443,434
FLUID FLOW MEASURING APPARATUS
William C. Baker, James M. Benson, and Charles E. Hawk, Hampton, Va., assignors, by mesne assignments, to Teledyne, Inc., Los Angeles, Calif., a corporation of Delaware
Filed Mar. 30, 1967, Ser. No. 627,230
Int. Cl. G01f 1/00
U.S. Cl. 73—202        9 Claims

ABSTRACT OF THE DISCLOSURE

Apparatus for measuring the flow of fluid through a main supply line which has a head element therein to develop a pressure drop. A shunt fluid flow path bypasses this element. The shunt path includes a conduit at least a portion of which is electrically and thermally conductive, the conductive portion having one or more thermoelectric devices positioned therealong. Heating current is passed through the conductive conduit portion, and the temperature gradient caused by fluid flow through the heated conduit is sensed by the thermoelectric devices to provide an indication of mass flow substantially independent of pressure and temperature.

---

The present invention is directed to apparatus known as shunt flowmeters for measuring the flow of fluid through a main supply line. Typically, such flowmeters employ a dynamic head element in the main line which develops a pressure drop across the element. This drop varies in accordance with the flow in the line. The element may be an orifice plate, a nozzle, a pitot-static tube, a venturi-shaped constriction, or the like. A bypass, or shunt line, is connected across the head element to divert a definite fraction of the flow in the main line through a transducer. The fractional part of the flow in the shunt line is used to determine the total flow in the main supply line.

The transducers which have been employed in the past to sense flow in the shunt line suffer disadvantages which the present invention overcomes. More particularly, mechanical devices, such as rotameters, do not measure mass flow, and are relatively insensitive at low flow rates. Conventional electrical transducers of the so-called "hot-wire" type, which are introduced into the shunt line so as to be cooled by the shunted fluid to effect a flow measurement, are subject to damage from streaming debris in the line. In the case where the fluid is combustible, such transducers pose an ignition problem. Furthermore, "hot-wire" transducers are sensitive to the thermal conductivity of the fluid.

The present invention overcomes the foregoing deficiencies by providing improved combinations of a shunt type flowmeter and transducers which are sensitive to a wide range of fluid flow, insensitive to variations in the fluid's thermal conductivity, minimize ignition hazards, and measure mass flow of any one particular gas substantially independent of pressure and temperature.

Briefly, the invention comprises a main supply line carrying the fluid, the flow characteristics of which are to be measured. A dynamic head element is provided in the main line to develop a differential pressure in the line. An external shunt line, or bypass, is connected to the main supply line so as to divert a portion of the fluid through the shunt from the high pressure side of the head element to the low pressure side. A thermal flowmeter is connected in the shunt line. This flowmeter includes a thermally and electrically conductive section of conduit having first and second ends coupled to a heat sink, and one or more thermoelectric devices positioned along the conduit. Heating current is passed through the conductive conduit section, and the thermoelectric voltages generated by these devices are used to indicate flow characteristics.

The invention will become more fully apparent when considered in light of the following detailed description of illustrated embodiments of the invention and from the appended claims.

The illustrative embodiments may be best understood by reference to the accompanying drawings, wherein:

FIGURE 3 is a graph illustrating temperatures at points along the length of a heated conduit as a function of fluid flow through the conduit;

FIGURE 4 is a schematic drawing, partially in section, illustrating a third embodiment of the invention utilizing the principles represented by FIGURE 3; and FIGURE 5 is a schematic diagram, partially in section, illustrating a fourth embodiment of the invention.

Figure 1:
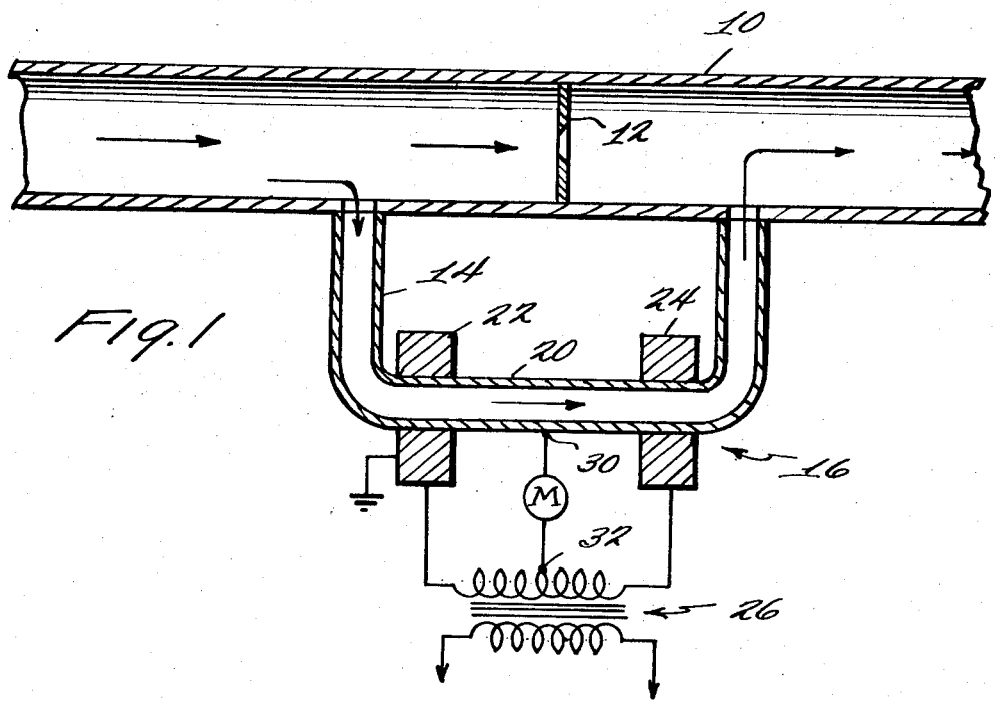
FIGURE 1 is a schematic drawing, partially in section, illustrating a first embodiment of the invention.

Referring first to FIGURE 1, a basic arrangement is illustrated for measuring the fluid flow in a main supply line, designated by the numeral 10, the fluid moving in a direction indicated by the arrowheads. A dynamic head element 12 is positioned in the supply line to develop a pressure drop which is proportional to the first power of the fluid density and the square of the velocity of the fluid. Conventional dynamic head elements for creating such a pressure drop include orifice plates (as illustrated), pitot-static tubes, nozzles, venturi-shaped constrictions, and the like. The head element creates a pressure differential between opposite sides of the element.

An exterior shunt line 14 bridges the main supply element 12 diverting a portion of the fluid streaming in the main line. The resultant mass flow rate in the shunt line is therefore in proportion to the total mass flow through the main line.

Measurement of the fluid flow in the shunt line is accomplished by a thermal mass flowmeter, generally indicated as 16. The illustrated flowmeter, as well as a number of variations thereof also suitable for this application, are described in detail in United States Patents 3,181,357 and 3,229,522, issued respectively on May 4, 1965, and January 18, 1966, to James M. Benson. The thermal mass flowmeter 16 includes a conduit section 20 which forms a portion of shunt line 14. Conduit section 20 is electrically and thermally conductive and is coupled at its ends to heat sinks 22 and 24. The heat sinks are characterized as masses of material which remain substantially at the ambient temperature of their surroundings, even when heating current is passed through the sinks and through conduit section 20. However, due to the fact that the conduit section is of lesser mass than the heat sinks, it is heated to a temperature above its ambient surroundings as current is passed therethrough. A transformer 26 is connected to heat sinks 22 and 24 to drive heating current through conduit section 20 when the transformer is energized. A thermoelectric device 30, such as a thermocouple, is located along conduit 20. The thermoelectric device is connected through a meter M to point 32 on the secondary winding of transformer 26. Assuming that the secondary winding is of the same material as the heat sinks to which the winding is connected at its ends, the meter M responds to the difference in temperature between the junction point of the thermoelectric device and the heat sinks. The temperature sensed by the thermoelectric device 30 is proportional to the flow in conduit section 20. Therefore, with the knowledge of the splitting ratio between the main supply and shunt lines, the meter M may be calibrated to indicate total mass flow of the fluid flow in the main line.

Figure 2:
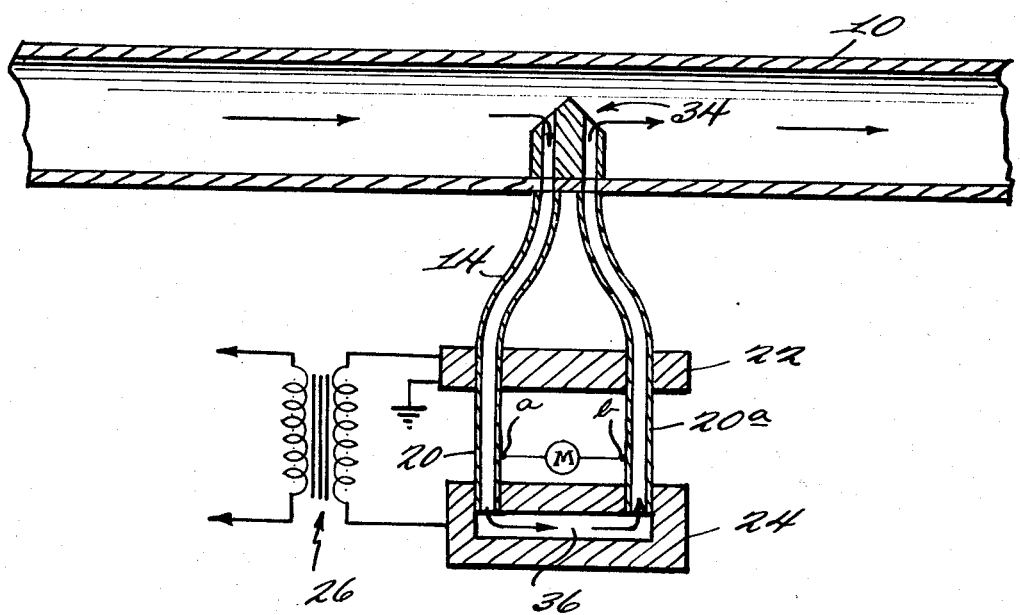
FIGURE 2 is a schematic drawing, partially in section, illustrating a second embodiment of the invention.

FIGURE 2 illustrates a second apparatus for measuring mass flow of fluid streaming in a main supply line 10. In this case, so as to illustrate the use of another dynamic head element, a pitot-static tube 34 is shown rather than the orifice plate 12 of the embodiment of FIGURE 1. The shunt line 14 includes a conduit section 20 extending between heat sinks 22 and 24. In addition, however, the sink 24 includes an internal passage 36 for delivering fluid to a further thermally and electrically conductive conduit section 20a extending between sinks 22 and 24. The meter M now extends between thermoelectric devices a and b on conduits 20 and 20a, respectively. The thermoelectric devices a and b are located along conduits 20 and 20a so as to be at equipotential points in respect to the heating current supplied by transformer 26. This prevents heating current from flowing through meter M. The meter responds to the difference in temperature between the points on the conduit sections where thermoelectric devices a and b are located, as described in Patents Nos. 3,181,357 and 3,229,522. Again, with knowledge of the splitting ratios the shunt mass flowmeters may be calibrated to read the total mass flow through the main line.

Use of an orifice plate in a shunt line to obtain a constant splitting ratio results in acceptable performance in many circumstances. However, difficulties may be encountered in providing a small orifice plate so that the ratio of mass flow in the main supply line and the mass flow in the shunt line remains constant over the entire range of flows. One difficulty is the fact that the coefficient of an orifice plate varies generally with Reynolds number. Since both a dynamic head element in the main supply line and the orifice in the shunt line must have a constant relationship over the entire range of mass flow to be measured, Reynolds number variations can adversely affect this relationship. Furthermore, a small size orifice would be needed in the shunt line to limit the flow to a practical range for measurement by the flowmeter.

In a third embodiment (FIGURE 4) of the present invention a viscous restriction such as a capillary is utilized as the dynamic head 44 in the shunt line. As stated previously, the pressure drop across an orifice type head element is proportional to the first power of the fluid density and the square of the fluid velocity. However, in accordance with Poiseuille's law for viscous flow in capillaries, the pressure drop across the capillary is proportional to the first power of the fluid velocity therethrough. Assuming that apart from the capillary restrictor the shunt line has negligible pressure drop, it can be seen that the mass flow in the shunt line varies as the square of the mass flow in the main supply line. Thus, the flowmeter in the shunt line can measure mass flow in the main line but with a response that varies with the square of the flow in the main line. However, it is feasible for the flow indication to have a linear relationship to the mass flow rate with embodiment 3.

To show how this may actually be accomplished, reference is first made to FIGURE 3 of the drawings. This figure illustrates a heated conduit section having its ends connected to a heat sink and fluid flowing therethrough in the direction of the arrowhead. Thermo-electric devices a through e are symmetrically spaced along the conduit section with respect to a central device c. The graph illustrates the temperature variations sensed by each thermoelectric device as the mass flow through the conduit section is varied. The curves do not in general conform to a simple equation, although over a limited range one, or a combination of two or more curves, may for practical purposes be considered to approximate some desired relation. For example, the curve of thermoelectric device c, located at the conduit section midpoint, approximates a linear relationship between temperature and flow over a usable range of mass flow. Also, the difference in temperatures sensed by symmetrically spaced devices, such as a and e, may be used as an approximately linear function of mass flow over a limited range near zero. However, it can be seen that where the temperature varies in a nonlinear manner, such as in the curves of thermoelectric devices e or a, this square root output of the shunt line mass flowmeter can be utilized to obtain a linear mass flow indication for the main line. By appropriately analyzing such curves as those illustrated in FIGURE 3, the capillary restriction in the shunt line may be varied in length and diameter, as required, to establish a capillary which will accurately produce flowmeter readings over the desired operating range.

FIGURE 4 illustrates an arrangement in which the shunt line 14 includes a plurality of thermally and electrically conductive capillaries which provide a viscous restriction to the flow shunted around the dynamic head element 12. The thermal flowmeter, generally indicated at 40, is described in detail in the aforementioned Patent 3,229,522. Briefly, however, the flowmeter includes the thermally and electrically conductive capillaries 42, 44 and 46 connected in serial fashion by means of passageways in heat sinks 48 and 50. Two thermoelectric devices are provided on each capillary, and the devices are connected in series through meter M. Consequently, a very sensitive measuring circuit is provided since the outputs of the thermoelectric devices are additively coupled. Utilizing such an arrangement, and appropriately adjusting the capillary dimensions, a plurality of response curves of the type illustrated in FIGURE 3 can be generated so as to precisely combine the electrical effects obtainable from a number of thermoelectrical devices to develop an appropriate square root function over a desired operating range. Thus, an extremely accurate mass flowmeter can be obtained.

A further embodiment of the invention is shown in FIGURE 5. This embodiment is identical with that of FIGURE 1 except that a venturi-shaped constriction, generally indicated at 52, is substituted for the orifice plate 12 in FIGURE 1.

The above-described embodiments are illustrative of preferred embodiments of the invention but are not intended to limit the possibilities of insuring the features of an extremely sensitive fluid flowmeter operable over a wide flow range. For a given situation, different thermal flowmeters of the type disclosed in the cited patents could be substituted for those specifically illustrated and described herein. The arrangements described herein are examples of apparatus in which the inventive features of this disclosure may be utilized, and it will become apparent to one skilled in the art that certain modifications may be made within the spirit of the invention as defined by the appended claims.

What is claimed is:
1. Apparatus for measuring fluid flow through a main supply line, comprising:
  (a) a head element within said main line for developing a differential pressure proportional to the first power of the fluid density and to the square of the velocity of the fluid;
  (b) a shunt line connected to the main line to divert fluid from the main line at the higher pressure side of the element and to return the fluid to said main line at the lower pressure side of the element, the pressure across said shunt line being proportional to the first power of the fluid flow therethrough;
  (c) a thermal flowmeter connected in said shunt line, said flowmeter including:
    (1) a thermally and electrically conductive conduit section joined to said shunt line to pass said diverted fluid;
    (2) means for electrically heating said conduit section; and
    (3) at least one thermoelectric device joined to said conduit section and responsive to the temperature of its junction with the conduit and so located as to develop at the junction an output that is approximately a linear function of fluid flow in the main line.

2. Apparatus for measuring fluid flow as set forth in claim 1, wherein said head element is a pitot-static tube.

3. Apparatus for measuring fluid flow as set forth in claim 1, wherein said head element is an orifice plate.

4. Apparatus for measuring fluid flow as set forth in claim 1, wherein said head element is a venturi-type element.

5. Apparatus for measuring fluid flow as set forth in claim 1, wherein said shunt line includes a capillary which provides a viscous restriction to said diverted fluid flow to thereby develop an output from said thermoelectric device representative of the square of the mass flow in the main supply line.

6. Apparatus for measuring fluid flow as set forth in claim 5, wherein said capillary is the conduit section of said thermal flowmeter.

7. Apparatus for measuring fluid flow as set forth in claim 1, wherein said flowmeter includes:
  (1) a plurality of interconnected thermally and electrically conductive conduit sections joined to said shunt line to pass said diverted fluid therethrough;
  (2) means for electrically heating each of said conduit sections; and
  (3) at least one thermoelectric device joined to each of said conduit sections and electrically connected to one another to additively develop a combined output that is approximately a linear function of fluid flow in the main line.

8. Apparatus for measuring fluid flow as set forth in claim 7, wherein said shunt line includes at least one capillary which provides a viscous restriction to said diverted fluid flow to thereby develop combined output from the thermoelectric devices representative of the square of the mass flow in the main supply line.

9. Apparatus as set forth in claim 8, wherein at least one of said conduit sections is also the capillary which provides a viscous restriction to said diverted fluid flow to thereby develop a combined output from the thermoelectric devices representative of the square of the mass flow in the main supply line.

References Cited

UNITED STATES PATENTS

| | | | |
|---|---|---|---|
| 1,989,332 | 1/1935 | Munster et al. | 73—212 X |
| 3,181,357 | 5/1965 | Benson | 73—204 |
| 3,229,522 | 1/1966 | Benson | 73—204 |

OTHER REFERENCES

| | | |
|---|---|---|
| 648,030 | 1/1951 | Great Britain. |
| 1,341,354 | 9/1963 | France. |

RICHARD C. QUEISSER, *Primary Examiner.*

EDWARD D. GILHOOLY, *Assistant Examiner.*

U.S. Cl. X.R.

73—204